US010512278B2

(12) United States Patent
Madsen et al.

(10) Patent No.: US 10,512,278 B2
(45) Date of Patent: Dec. 24, 2019

(54) INLINE MIXING INJECTOR FOR LIQUID PRODUCTS

(71) Applicant: Messer Industries USA, Inc., Bridgewater, NJ (US)

(72) Inventors: Scott Madsen, Burr Ridge, IL (US); Louis Lilakos, Ontario (CA)

(73) Assignee: Messer Industries USA, Inc., Bridgewater, NJ (US)

( * ) Notice: Subject to any disclaimer, the term of this patent is extended or adjusted under 35 U.S.C. 154(b) by 55 days.

(21) Appl. No.: 15/082,023

(22) Filed: Mar. 28, 2016

(65) Prior Publication Data

US 2016/0309756 A1    Oct. 27, 2016

Related U.S. Application Data

(60) Provisional application No. 62/152,226, filed on Apr. 24, 2015.

(51) Int. Cl.
 *A23L 3/36* (2006.01)
(52) U.S. Cl.
 CPC .................................. *A23L 3/361* (2013.01)
(58) Field of Classification Search
 CPC . A23C 3/033; A23C 3/04; A23L 3/001; A23L 3/18; A23L 3/361; F25D 3/10; F25D 3/12
 USPC ......... 99/445, 359, 330, 370, 455, 460, 466, 99/468; 62/63, 50.6, 52.1, 64, 373; 426/312, 442, 524, 406; 366/101, 107, 366/165.1, 178.1, 178.2, 178.3, 181.6, 366/191, 336, 340, 341, 165.5, 181.5, 366/182.1, 182.2, 177.1, 176, 34, 1; 406/86, 88, 89, 92; 222/195; 422/224, 422/603, 135, 138, 109, 110, 111, 198
See application file for complete search history.

(56) References Cited

U.S. PATENT DOCUMENTS 3,214,928 A    11/1965 Oberdorfer
3,368,363 A    2/1968 Alaburda et al.
(Continued)

FOREIGN PATENT DOCUMENTS

WO    WO 03/012339 A1    2/2003
WO    WO 2014/031725 A2    2/2014

OTHER PUBLICATIONS

International Search Report for PCT/US16/27444, dated Jul. 26, 2016, Authorized Officer: Shane Thomas, 3 pages.
(Continued)

*Primary Examiner* — Dana Ross
*Assistant Examiner* — Ket D Dang
(74) *Attorney, Agent, or Firm* — Joshua L. Cohen (57) ABSTRACT

An apparatus for reducing the temperature of a liquid product in a processing line includes a polymer member having a passageway formed therein for receiving a liquid product in the passageway; an inlet and an outlet each in fluid communication with a corresponding opposed end of the passageway; a plurality of delivery channels formed in the polymer member, each one of the plurality of delivery channels having an opening in fluid communication with a different location of the passageway and constructed to provide a chilling medium into the passageway; and a support member for the polymer member, the support member constructed to mount the polymer member in the processing line. A related method is also provided.

9 Claims, 6 Drawing Sheets

(56) References Cited

U.S. PATENT DOCUMENTS

| | | | |
|---|---|---|---|
| 3,672,182 A | | 6/1972 | Stowasser et al. |
| 3,871,583 A | * | 3/1975 | Kellert .................. B05B 7/1481 |
| | | | 239/302 |
| 4,220,012 A | * | 9/1980 | Brister .................. F16L 55/103 |
| | | | 62/130 |
| 4,390,284 A | * | 6/1983 | Hyde ..................... B01D 47/06 |
| | | | 118/303 |
| 4,616,935 A | * | 10/1986 | Harrison ............... B01F 3/1271 |
| | | | 209/11 |
| 4,743,405 A | * | 5/1988 | Durao ................... B01F 5/0475 |
| | | | 261/76 |
| 4,865,460 A | * | 9/1989 | Friedrich ................ B01F 5/061 |
| | | | 138/42 |
| 5,040,374 A | | 8/1991 | Micheau |
| 5,597,236 A | * | 1/1997 | Fasano .................. B01F 5/0451 |
| | | | 366/181.5 |
| 5,692,544 A | * | 12/1997 | Friedrich ............... F16L 55/17 |
| | | | 138/109 |
| 6,510,890 B1 | | 1/2003 | Paskach et al. |
| 6,669,843 B2 | * | 12/2003 | Arnaud ............. B01D 21/2433 |
| | | | 210/188 |
| 8,192,070 B2 | * | 6/2012 | Allen .................... B01F 3/1228 |
| | | | 366/132 |
| 8,551,417 B2 | * | 10/2013 | Shiraishi ............... B01F 5/0057 |
| | | | 366/176.1 |
| 2004/0240311 A1 | * | 12/2004 | Hashiba ................ B01F 3/188 |
| | | | 366/101 |
| 2005/0095313 A1 | | 5/2005 | Ciccone |
| 2005/0120725 A1 | | 6/2005 | Frati |
| 2005/0132721 A1 | | 6/2005 | Ingham et al. |
| 2005/0252840 A1 | * | 11/2005 | Arnold .................. B01F 5/0256 |
| | | | 210/198.2 |
| 2006/0056271 A1 | * | 3/2006 | Kapila .................. B01F 3/0865 |
| | | | 366/181.5 |
| 2006/0283195 A1 | | 12/2006 | Rosenbaum et al. |
| 2006/0283196 A1 | * | 12/2006 | Rosenbaum ............. A23D 7/05 |
| | | | 62/63 |
| 2009/0226586 A1 | * | 9/2009 | Garwood ................ A23B 4/16 |
| | | | 426/442 |
| 2010/0085833 A1 | * | 4/2010 | Zaiser ................... B01F 5/0475 |
| | | | 366/107 |
| 2011/0296853 A1 | | 12/2011 | Algoet et al. |
| 2011/0305102 A1 | | 12/2011 | Berger et al. |

OTHER PUBLICATIONS

Written Opinion of the International Search Report for PCT/US16/27444, dated Jul. 26, 2016, Authorized Officer: Shane Thomas, 10 pages.

European Search Report for EP 15 17 5966, dated Dec. 17, 2015, 9 pages.

International Preliminary Report on Patentability for PCT/US2016/027444, dated Nov. 2, 2017, Authorized Officer: Agnes Wittmann-Regis, 8 pages.

* cited by examiner

INLINE MIXING INJECTOR FOR LIQUID PRODUCTS

BACKGROUND

The present embodiments relate to apparatus for mixing and chilling liquid food products such as for example sauces, soups, marinades, dairy or other heated or pasteurized liquids.

Liquid food products are frequently heated for their production and/or sterilization prior to consumption or subsequent processing for consumption. During such processing, the liquid food product is cooled for storage or for use with other food products during the processing thereof. The cooling may occur directly or indirectly through heat exchangers with the use of cryogen or other chilling substances.

However, known apparatus and systems to mix and chill liquid food products do not do so in an uniformly rapid manner that for commercial operators is necessary in order to meet production quotas, reduce bacteria growth, and comply with other requirements and regulations. In addition, these apparatus and systems suffer from "knocking" or "hammering", due to systemic pipe pressures caused by icing or freezing of the liquids to inner walls of system piping which reduces the internal diameter of the piping and causes the knocking, etc. The metallic materials used in the construction of such known apparatus and systems are exposed to such icing/freezing conditions which also contributes to the knocking, etc.

SUMMARY OF THIS INVENTION

There is therefore provided an inline mixing injector apparatus embodiment for reducing the temperature of a liquid product in a processing line, which includes a polymer member having a passageway formed therein for receiving a liquid product in the passageway; an net and an outlet each in fluid communication with a corresponding opposed end of the passageway; a plurality of delivery channels formed in the polymer member, each one of the plurality of delivery channels having an opening in fluid communication with a different location of the passageway and constructed to provide a chilling medium into the passageway; and a support member for the polymer member, the support member constructed to mount said polymer member ire the processing line.

There is also provided herein a method for reducing the temperature of a liquid product in a processing line, the method including introducing a liquid product through a passageway of a housing for chilling said liquid product in said passageway; providing into the passageway a plurality of streams of a chilling medium at different locations of the passageway; and mounting the housing in the processing line.

BRIEF DESCRIPTION OF THE DRAWINGS

For a more complete understanding of the present embodiments, reference may be had to the following description of exemplary embodiments considered in connection with the accompanying drawings, of which.

DETAILED DESCRIPTION OF THE INVENTION

Before explaining the inventive embodiments in detail, it is to be understood that the invention is not limited in its application to the details of construction and arrangement of parts illustrated in the accompanying drawings, if any, since the invention is capable of other embodiments and being practiced or carried out in various ways. Also it is to be understood that the phraseology or terminology employed herein is for the purpose of description and not of limitation.

The embodiments shown in FIGS. 1-6 improve the rate for chilling sauces, soups, marinades, dairy and other hot liquid products, such as for example liquid food products. The chilling occurs rapidly, and is accomplished during a single pass through the embodiments presented to arrive at the desired reduced temperature. Upon being exhausted from outlets of the embodiments described below the liquid food product is substantially and uniformly cooled. All of the embodiments, unless otherwise indicated, are constructed of a polymer or related material of TEFLON®, ultra high molecular weight (UHMW) plastic or other type of plastic material, which provides for improved operating characteristics as will be discussed hereinbelow.

Figure 1:
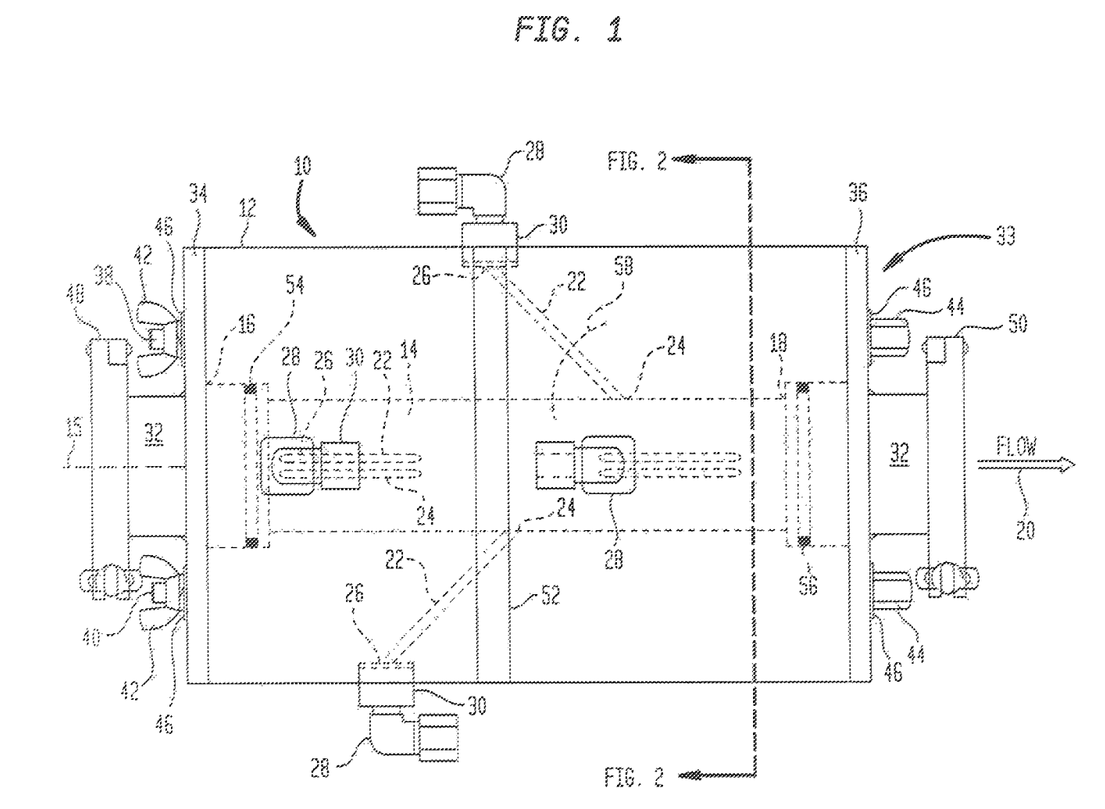
FIG. 1 shows a first embodiment of the apparatus according to the present invention.
Figure 2:
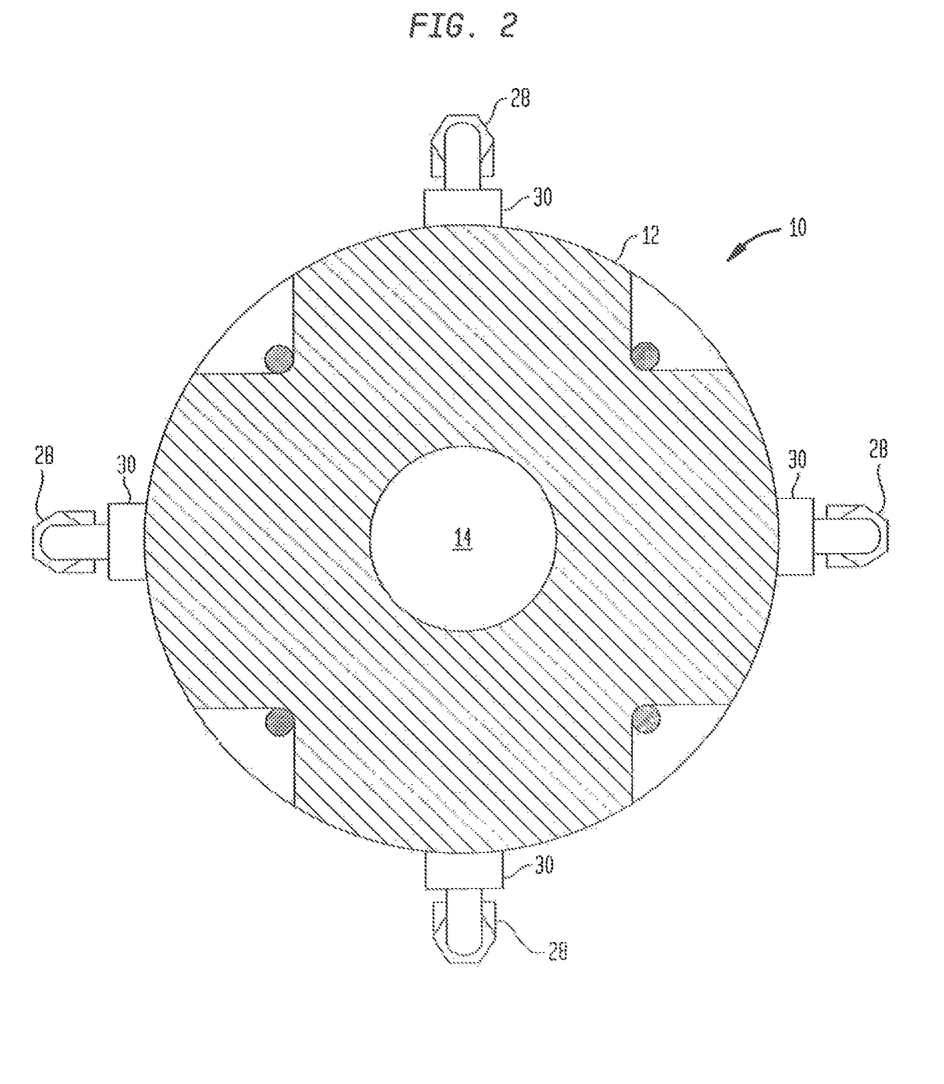
FIG. 2 is a view of the apparatus taken along line 2-2 in FIG. 1.

Referring to FIGS. 1-2, an apparatus embodiment of the invention is shown generally at 10 which includes a housing 12 or slug of material selected from the group consisting of UHMW plastic, polyethylene, other polymers, TEFLON®, and other plastic-type materials. The housing 12 may appear as a plastic cylindrical slug ("slug"), although other shapes for the housing may be employed. A passage 14 or passageway extends through the slug 12 from an inlet 16 to an outlet 18, the inlet and outlet being in fluid communication with the passage 14. As shown in FIG. 1, the passage 14 may be disposed along a central longitudinal axis 15 of the slug 12 by way of example only. It is understood that the disposition of the passage 14 within the slug 12 may be in alternate orientations.

The passage 14 as shown in FIGS. 1-2 has a uniform diameter consistent throughout its length and position within the slug 12. The diameter may be consistent with a width of from 2 inches to 4½ inches, depending upon the type and volume of liquid product transiting the passage 14 for being chilled. As shown in FIG. 1, arrow 20 indicates a flow of the liquid product through and from the passage 14 for chilling and subsequent processing or use.

The slug 12 is also formed with a plurality of channels 22 or ducts, each of such channels formed in the slug and opening for fluid communication with the passage 14. The channels 22 may be formed by drilling through the slug 12. The diameter of each channel can be ⅛", by way of example only. Referring to FIG. 1, each of the channels 22 has an aperture 24 opening into the passage 14. At an end of each of the channels 22 opposite to the aperture 24 there is provided an opening 26 in fluid communication with a corresponding nozzle 28 which delivers a chilling medium into the channel 22. Each one of the nozzles 28 is mounted in releasable engagement to a corresponding collar 30 with the collar forming a fluid tight seal between the nozzle 28 and a corresponding one of the openings 28 of channels 22. Another embodiment calls for each nozzle 28 being in fluid communication with a plurality of channels 22, as will be described herein below.

As shown in FIG. 1, each of the channels 22 is arranged at an angle with respect to the flow 20 of the liquid product passing through the passage 14. That is, although the channels 22 can be oriented tranverse to the longitudinal axis 15 of the passage 14, such orientation may be altered to facilitate introduction and mixing of the chilling medium with the liquid product transiting the passage. For example, each of the channels 22 may be arranged at an angle 58 of approximately 30° to 50° with respect to the passage 14, such that the aperture 24 of each of the channels 22 opens into the passage 14 at different positions along same. Introduction of the chilling medium through the channels 22 in such a manner imparts a rotational aspect of the chilling medium being introduced into the liquid product to facilitate uniform cooling of the liquid product and mixing of the chilling medium into same. The result is that the flow 20 exiting the outlet 18 of the passage 14 is more uniformly mixed and chilled, thereby substantially reducing if not eliminating pockets of the liquid product having different temperatures upon being exhausted from the slug 12.

It is also shown in FIG. 1 that the apertures 24 are arranged with respect to the passage 14 to describe a staggered or helical pattern to impart the twisting, rotational or cyclonic aspect of the chilling medium as it is introduced into the liquid product transiting the passage 14. It is also possible that the introduction of the chilling medium through the channels 22 is provided under pressure, thereby causing the chilling medium upon leaving the corresponding aperture 24 to be injected further into the liquid product in the passage 14 and to create vortices in the chilling medium to facilitate mixing of same in the liquid product which facilitates a more uniform chilling of same.

The chilling medium can be liquid or gaseous nitrogen, or liquid or gaseous carbon dioxide.

The housing 12 or slug can be retrofit, i.e. inserted into an existing liquid product line 32 as follows. The slug 12 can be cradled in a frame 33 and is removably mounted between a pair of brackets 34,36, and a pair of bolts 38,40 extend through each one of the brackets as shown and through a corresponding bore (not shown) through the slug 12 to be retained in position by mechanical fasteners 42,44 mounted at opposed ends of the corresponding one of the bolts 38,40. The mechanical fastener 42 may be a wingnut or butterfly nut, while the mechanical fastener 44 may be a nut. Washers 46 can be disposed on each of the bolts 38, 40 between the mechanical fasteners 42, 44 and the brackets 34,36 to securely position the slug 12 within the brackets and in orientation with respect to the existing product line 32.

Tri-clamp flanges 48,50 of the existing product line 32 provide for quick-release engagement of the apparatus 10 with respect to said existing product line 32.

A metal band 52 or strap, also part of the frame 33, is shown releasably securing one of the collars 30 (which is connected to a corresponding one of the nozzles 28) to the slug 12. For the sake of clarity in this FIG. 1, only one of the bands 52 is shown. It is understood however that the other collars 30 are also releasably secured to the slug 12 with a corresponding band or strap.

In contrast to the composition of materials of the apparatus 10, the nozzle 28 and all the features through to the metal band 52 are constructed of stainless steel.

Seals 54,56 or gaskets, such as for example o-rings, are disposed at a position where the existing product line 32 is joined to the net 16 and outlet 18 of the passage 14 in the slug 12. The seals 54,56 prevent liquid product flow through the passage 14 from seeping out of the interface or connection where the steel product line 32 contacts the plastic slug 12 to be in registration therewith.

Two other exemplary embodiments of the inline mixing injector for liquid products in accordance with the present invention are illustrated in the FIGS. 3-4 and 5-6, respectively. The elements and methods illustrated in FIGS. 3-4 and 5-6 correspond to the elements and methods described above with respect to FIGS. 1-2, and have further been designated by corresponding reference numerals increased by 100 and 200, respectively. The embodiments of FIGS. 3-6 are designed for use in the same manner as the FIGS. 1-2, unless otherwise stated.

Figure 3:
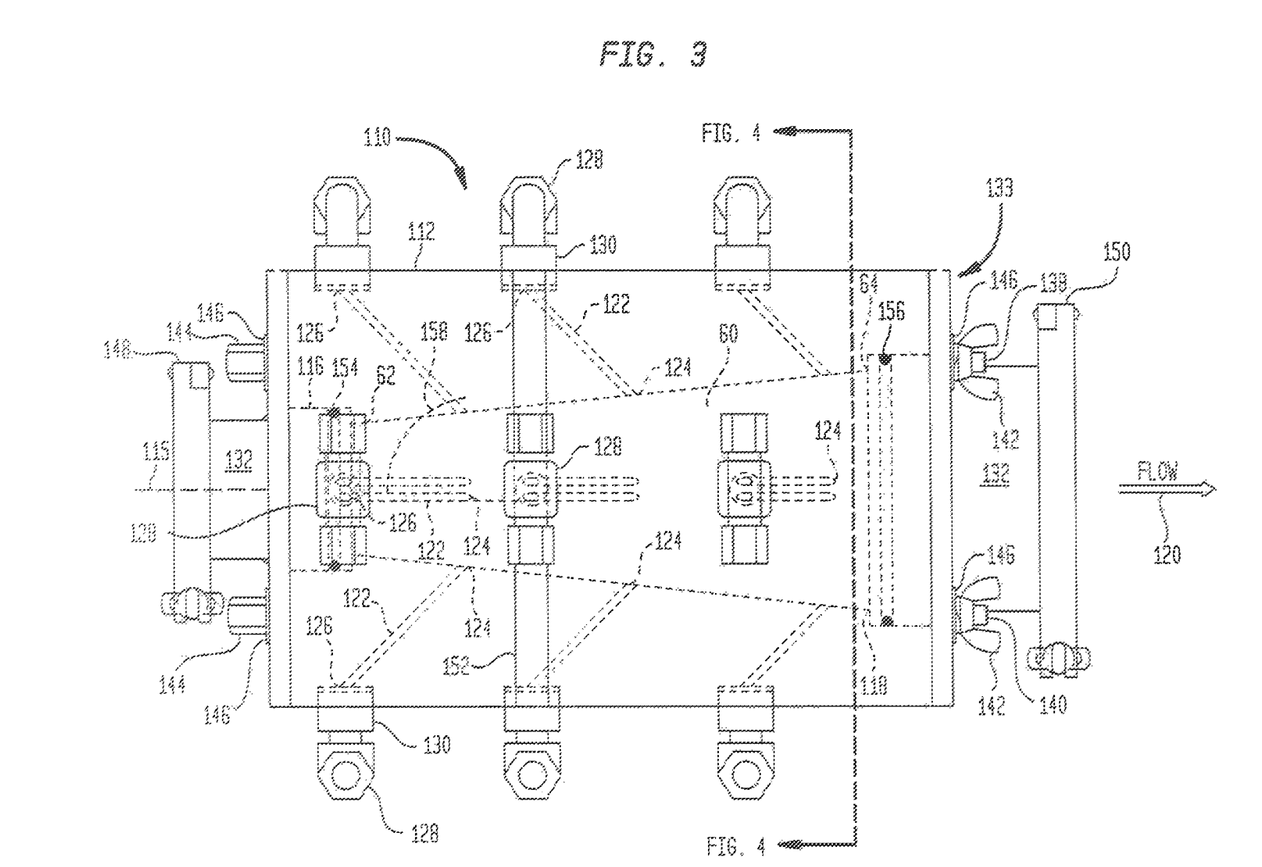
FIG. 3 shows another embodiment on the apparatus according to the invention.
Figure 4:
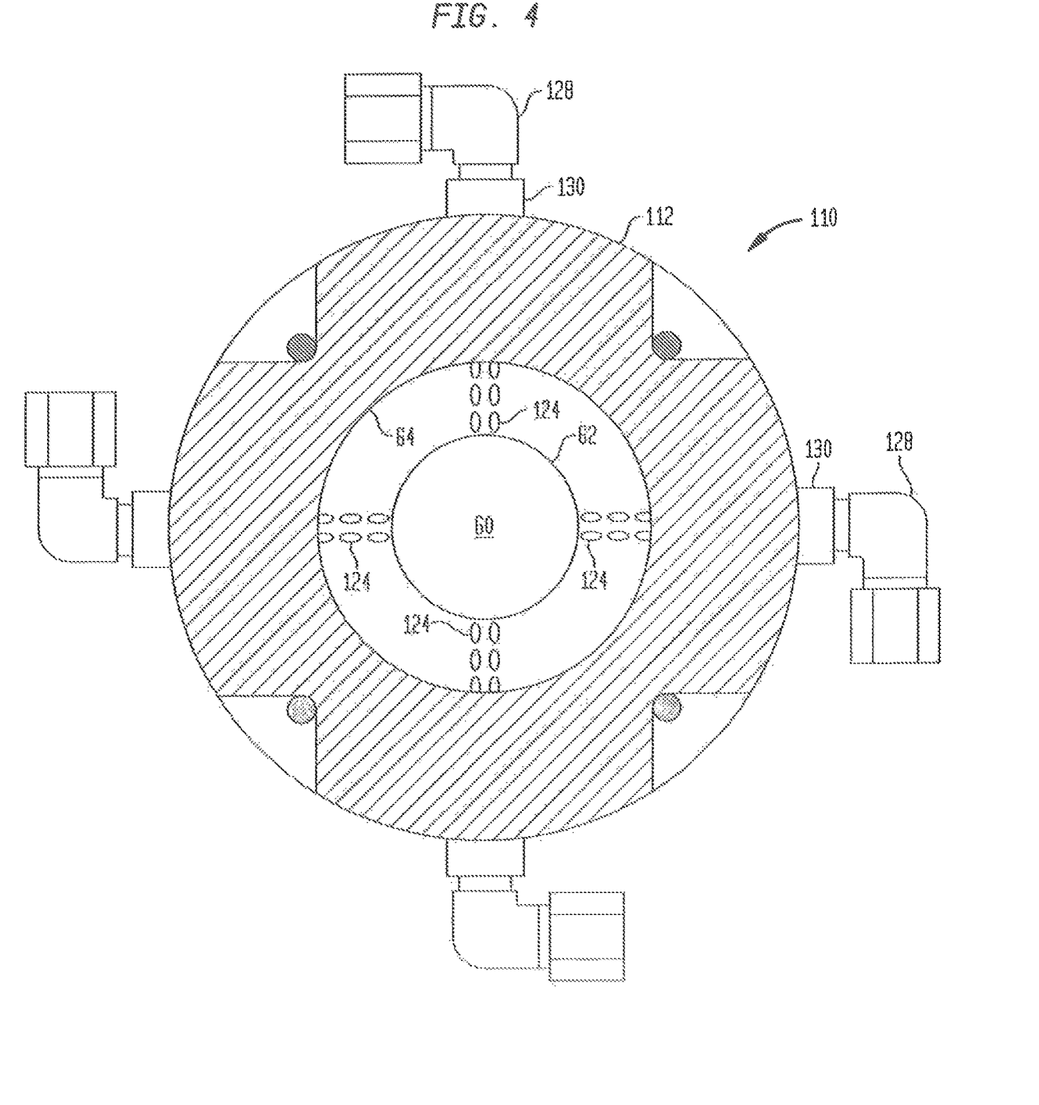
FIG. 4 shows a view of the apparatus taken along line 4-4 in FIG. 3.

Referring to FIGS. 3-4, an apparatus embodiment of the invention is shown generally at 110 which includes a housing 112 or slug of material selected from the group consisting of UHMW plastic, polyethylene, other polymers, TEFLON®, and other plastic-type materials. The housing 112 may appear as a plastic cylindrical slug ("slug"), although other shapes for the housing may be employed. A passage 60 extends through the slug 112 from an net 116 to an outlet 118, the net and outlet being in fluid communication with the passage. As shown in FIG. 3, the passage 60 may be disposed along a central longitudinal axis 115 of the slug 112 by way of example only. It is understood that the disposition of the passage 60 within the slug 112 may be in alternate orientations.

The passage 60 as shown in FIGS. 3-4 has a continually increasing diameter in its position within the slug 112. The diameter may be from 2 inches beginning at a region 62 near the inlet 116 and increasing to 4½ inches at a region 64 near the outlet 118, depending upon the type and volume of liquid product transiting the passage 60 for being chilled. FIG. 4 shows the expanding cone shaped diameter of the passage 60 in the slug 112. The passage 60 has a diameter that increases from proximate the net 116 to its greatest diameter at the outlet 118. As shown in FIG. 3, arrow 120 indicates a flow of the liquid product through and from the passage 60 for chilling and subsequent processing or use.

The slug 112 is also formed with a plurality of channels 122 or ducts, each of such channels formed in the slug and opening for fluid communication with the passage 60. The channels 122 may be formed by drilling through the slug 112. The diameter of each channel can be ⅛", by way of example only. Referring to FIG. 3, each of the channels 122 has an aperture 124 opening into the passage 60. At an end of each of the channels 122 opposite to the aperture 124 there is provided an opening 126 in fluid communication with a corresponding nozzle 128 which delivers a chilling medium into the channel 122. Each one of the nozzles 128 is mounted in releasable engagement to a corresponding collar 130 with the collar forming a fluid tight seal between the nozzle 128 and a corresponding one of the openings 126 of the channels 122. Another embodiment calls for each nozzle 128 being in fluid communication with a plurality of channels 122, as will be described herein below.

As shown in FIG. 3, each of the channels 122 is arranged at an angle with respect to the flow 120 of the liquid product passing through the passage 60. That is, although the channels 122 can be oriented tranverse to the longitudinal axis 115 of the passage 60, such orientation may be altered to facilitate introduction and mixing of the chilling medium with the liquid product transiting the passage. For example, each of the channels 122 may be arranged at an angle 158 of approximately 30° to 50° degrees with respect to the longitudinal axis 115 of the passage 60, such that the aperture 124 of each of the channels 122 opens into the passage 60 at different positions along same. Introduction of the chilling medium through the channels 122 in such a manner imparts a rotational aspect of the chilling medium being introduced into the livid product to facilitate uniform cooling of the liquid product and mixing of the chilling medium into same. The result is that the flow 120 exiting the outlet 118 of the passage 60 is more uniformly mixed and chilled, thereby substantially reducing if not eliminating pockets of the liquid product having different temperatures upon being exhausted from the slug 112.

It is also shown in FIG. 3 that the apertures 124 are arranged with respect to the passage 60 to describe a staggered or helical pattern to impart the twisting, rotational or cyclonic aspect of the chilling medium as it is introduced into the liquid product transiting the passage 60. It is also possible that the introduction of the chilling medium through the channels 122 is provided under pressure, thereby causing the chilling medium upon leaving the corresponding aperture 124 to be injected further into the liquid product in the passage 60 and to create vortices in the chilling medium to facilitate mixing of same in the liquid product which facilitates a more uniform chilling of same.

The chilling medium can be liquid or gaseous nitrogen, or liquid or gaseous carbon dioxide.

The housing 112 or slug can be retrofit, i.e. inserted into an existing liquid product line 132 as follows. The slug 112 can be cradled in a frame 133 and is removably mounted between a pair of brackets 134,136, and a pair of bolts 138,140 extend through each one of the brackets as shown and through a corresponding bore (not shown) through the slug 112 to be retained in position by mechanical fasteners 142,144 mounted at opposed ends of the corresponding one of the bolts 138,140. The mechanical fastener 142 may be a wingnut or butterfly nut, while the mechanical fastener 144 may be a nut. Washers 146 can be disposed on each of the bolts 138,140 between the mechanical fasteners 142,144 and the brackets 134,136 to securely position the slug 112 within the brackets and in orientation with respect to the existing product line 132.

Tri-clamp flanges 148,150 of the existing product line 132 provide for quick-release engagement of the apparatus 110 with respect to said existing product line 132.

A metal band 152 or strap, also part of the frame 133, is shown releasably securing one of the collars 130 (which is connected to a corresponding one of the nozzles 128) to the slug 112. For the sake of clarity in this FIG. 3, only one of the bands 152 is shown. It is understood however that the other collars 130 are also releasably secured to the slug 112 with a corresponding band or strap.

In contrast to the composition of materials of the apparatus 110, the nozzle 128 and all the features through to the metal band 152 are constructed of stainless steel.

Seals 154,156 or gaskets, such as for example o-rings, are disposed at a position where the existing product line 132 is joined to the inlet 16 and outlet 118 of the passage 60 in the slug 112. The seals 154,156 prevent liquid product flow through the passage 60 from seeping out of the interface or connection where the steel product line 132 contacts the plastic slug 112 to be in registration therewith.

Figure 5:
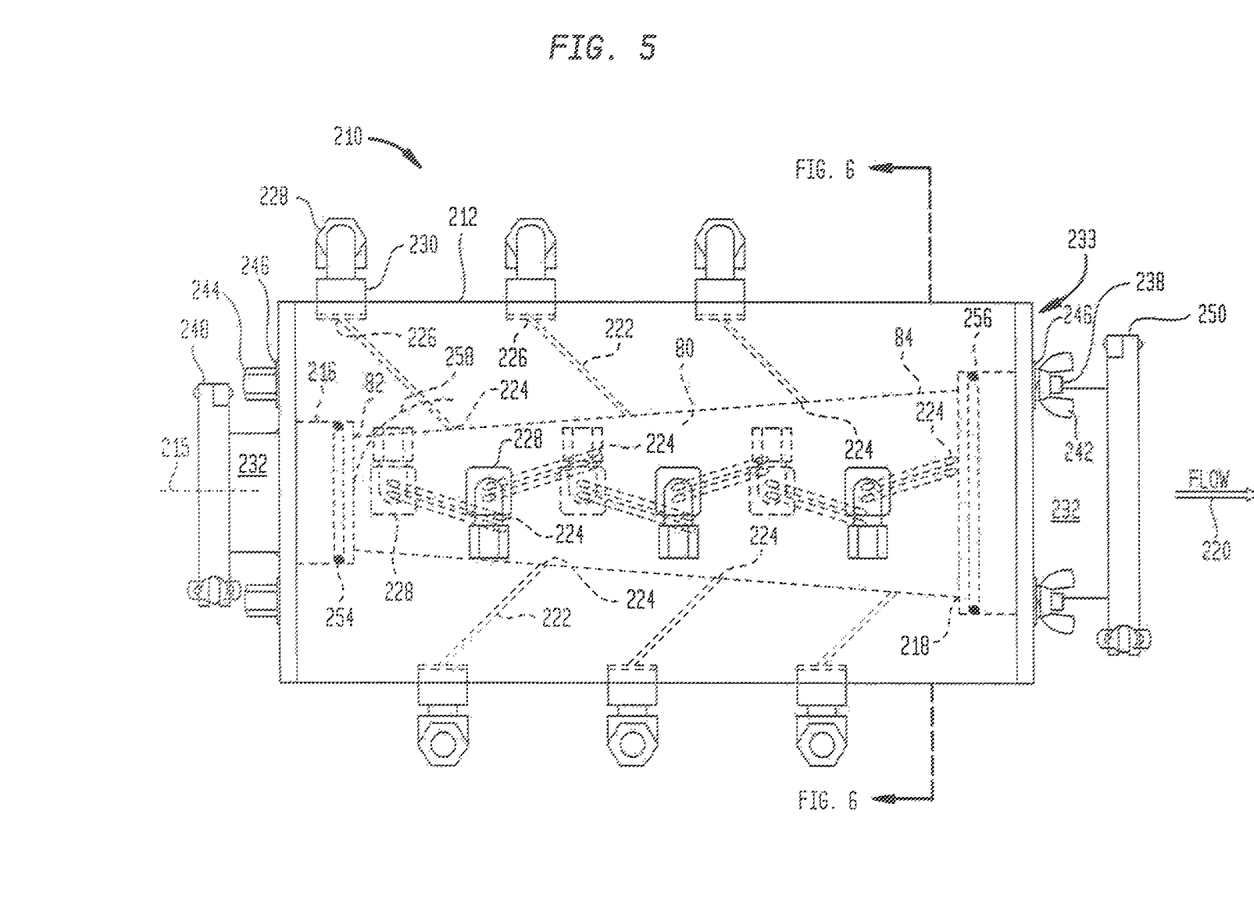
FIG. 5 shows still another embodiment of the apparatus according to the present invention.
Figure 6:
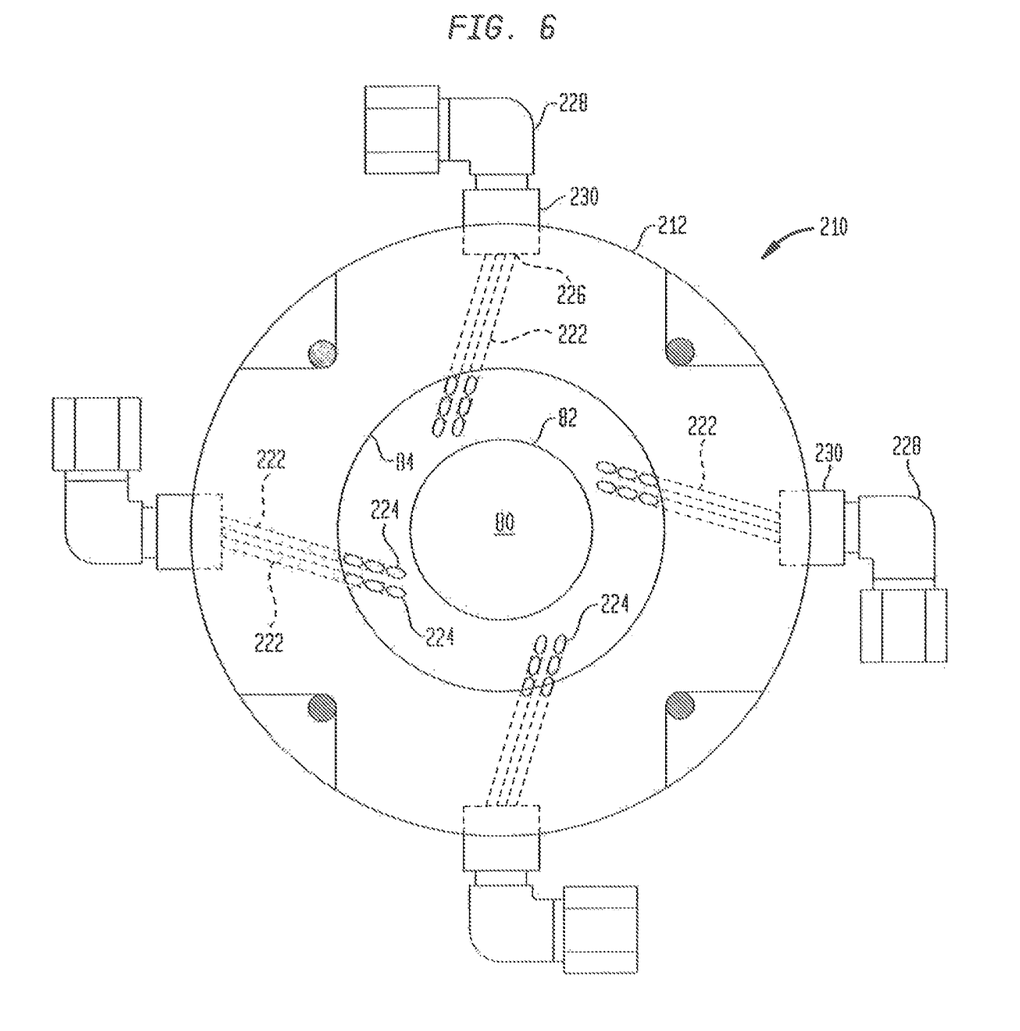
FIG. 6 shows a view of the apparatus taken along line 5-5 in FIG. 6.

Referring to FIGS. 5-6, an apparatus embodiment of the invention is shown generally at 210 which includes a housing 212 or slug of material selected from the group consisting of UHMW plastic, polyethylene, other polymers, TEFLON®, and other plastic-type materials. The housing 212 may appear as a plastic cylindrical slug ("slug"), although other shapes for the housing may be employed. A passage 80 extends through the slug 212 from an net 216 to an outlet 218, the net and outlet being in fluid communication with the passage 80. As shown in FIG. 5, the passage 80 may be disposed along a central longitudinal axis 215 of the slug 212 by way of example only. It is understood that the disposition of the passage 80 within the slug 212 may be in alternate orientations.

The passage 80 as shown in FIGS. 5-6 has a continually increasing diameter in its position within the sing 212. The diameter may be from 2 inches beginning at a region 82 near the net 216 and increasing to 4½ inches at a region 84 near the outlet 218, depending upon the type and volume of liquid product transiting the passage 80 for being chilled. FIG. 6 shows the expanding cone shaped diameter of the passage 80 in the slug 212. The passage 80 has a diameter that increases from proximate the net 216 to its greatest diameter at the outlet 218. As shown in FIG. 5, arrow 220 indicates a flow of the liquid product through and from the passage 80 for chilling and subsequent processing or use.

The slug 212 is also formed with a plurality of channels 222 or ducts, each of such channels formed in the slug and opening for fluid communication with the passage 80. The channels 222 may be formed by drilling through the slug 212. The diameter of each channel can be ⅛", by way of example only. Referring to FIG. 5, each of the channels 222 has an aperture 224 opening into the passage 80. At an end of each of the channels 222 opposite to the aperture 224 there is provided an opening 226 in fluid communication with a corresponding nozzle 228 which delivers a chilling medium into the channel 222. Each one of the nozzles 228 is mounted in releasable engagement to a corresponding collar 230 with the collar forming a fluid tight seal between the nozzle 228 and a corresponding one of the openings 226 of the channels 222. Another embodiment calls for each nozzle 228 being in fluid communication with a plurality of channels 222, as will be described herein below.

As shown in FIG. 5, each of the channels 222 is arranged at an angle with respect to the flow 220 of the liquid product passing through the passage 80. That is, although the channels 222 can be oriented tranverse to the longitudinal axis 215 of the passage 80, such orientation may be altered to facilitate introduction and mixing of the chilling medium with the liquid product transiting the passage. For example, each of the channels 222 may be arranged at an angle 258 of approximately 30° to 50° degrees with respect to the longitudinal axis 215 of the passage 80, such that the aperture 224 of each of the channels 222 opens into the passage 80 at different positions along same. Introduction of the chilling medium through the channels 222 in such a manner imparts a rotational aspect of the chilling medium being introduced into the liquid product to facilitate uniform cooling of the liquid product and mixing of the chilling medium into same. The result is that the flow 220 exiting the outlet 218 of the passage 80 is more uniformly mixed and chilled, thereby substantially reducing if not eliminating pockets of the liquid product having different temperatures upon being exhausted from the slug 212.

It is also shown in FIG. 5 that the apertures 224 are arranged with respect to the passage 80 to describe a staggered or helical pattern to impart the twisting, rotational or cyclonic aspect of the chilling medium as it is introduced into the liquid product transiting the passage 80. It is also possible that the introduction of the chilling medium through the channels 222 is provided under pressure, thereby causing the chilling medium upon leaving the corresponding aperture 224 to be injected further into the liquid product in the passage 80 and to create vortices in the chilling medium to facilitate mixing of same in the liquid product which facilitates a more uniform chilling of same.

The chilling medium can be liquid or gaseous nitrogen, or liquid or gaseous carbon dioxide.

The housing 212 or slug can be retrofit, i.e. inserted into an existing liquid product line 232 as follows. The slug 212 can be cradled in a frame 233 and is removably mounted between a pair of brackets 234,236, and a pair of bolts 238,240 extend through each one of the brackets as shown and through a corresponding bore (not shown) through the slag 212 to be retained in position by mechanical fasteners 242,244 mounted at opposed ends of the corresponding one of the bolts 238,240. The mechanical fastener 242 may be a wingnut or butterfly nut, while the mechanical fastener 244 may be a nut. Washers 246 can be disposed on each of the bolts 238,240 between the mechanical fasteners 242,244 and the brackets 234,236 to securely position the slug 212 within the brackets and in orientation with respect to the existing product line 232.

Tri-clamp flanges 248,250 of the existing product line 232 provide for quick-release engagement of the apparatus 210 with respect to said existing product line 232.

A metal band 252 or strap, also part of the frame 233, is shown releasably securing one of the collars 230 (which is connected to a corresponding one of the nozzles 228) to the slug 212. For the sake of clarity in this FIG. 5, only one of the bands 252 is shown. It is understood however that the other collars 230 are also releasably secured to the slug 212 with a corresponding band or strap.

In contrast to the composition of materials of the apparatus 210, the nozzle 228 and all the features through to the metal band 252 are constructed of stainless steel.

Seals 254,256 or gaskets, such as for example o-rings, are disposed at a position where the existing product line 232 is joined to the net 216 and outlet 218 of the passage 80 in the slug 212. The seals 254,256 prevent liquid product flow through the passage 80 from seeping out of the interface or connection where the steel product line 232 contacts the plastic slug 212 to be in registration therewith.

The present embodiments provide for a faster and more efficient chilling of the liquid food product for increase production with less contamination of same. The present embodiments also provide for greater flexibility of any processing system to which the embodiments are connected, increase productivity and flexibility with respect to high liquid products being input into the system and of course a greater range of liquid products can now be acted upon by the apparatus.

The use of plastics or TEFLON® requires less maintenance, and such materials reduce the medium for bacteria growth and clogging of the embodiments with frozen food products and condensation which is known to occur with stainless steel construction.

Because of the manner by which the liquid product is mixed, product temperature consistency is improved so that the resulting pull down rate of the liquid product provides for an improved product quality while at the same time reducing product waste.

The use of TEFLON®, UHM, polymers or plastic in the construction of the embodiments limits the extreme cold in the system from being transmitted from an input pipeline and nozzles which correspondingly eliminates any build up of the liquids, sauces, etc. at the inner wall of the transfer one; a more uniform temperature distribution is provided to the liquid products being mixed; and the mixing action of the liquid food products eliminates sticking or adherence of same to the transfer lines.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. An apparatus for reducing the temperature of a liquid food product in a processing line, comprising:
    a polymer member having a passageway formed therein for receiving the liquid food product in the passageway, the polymer member comprising a slug of material selected from the group consisting of TEFLON®, ultra high molecular weight (UHMW) plastic, and other plastic material;
    an inlet and an outlet each in fluid communication with a corresponding opposed end of the passageway;
    a plurality of delivery channels formed in the polymer member, each one of the plurality of delivery channels having an aperture in fluid communication with a different location of the passageway, respective apertures of the plurality of delivery channels comprising a helical pattern along the passageway and constructed to introduce a chilling medium in the helical pattern into the liquid food product in the passageway, and wherein each of the plurality of delivery channels are disposed at an angle less than 90° with respect to a longitudinal axis of the passageway, and wherein the angle of each of the plurality of delivery channels approaches a direction of flow of the chilling medium in the passageway; and
    a support member for the polymer member, the support member constructed to mount said polymer member in the processing line.

2. The apparatus of claim 1, wherein the slug has a circular cross-section.

3. The apparatus of claim 1, wherein the passageway comprises a continuous uniform diameter.

4. The apparatus of claim 1, further comprising a nozzle in fluid communication with an opening of each of the plurality of delivery channels opposite to the aperture.

5. The apparatus of claim 4, wherein the nozzle is in fluid communication with a plurality of openings of the delivery channels.

6. The apparatus of claim 1, wherein the support member comprises a frame.

7. The apparatus of claim 6, wherein the frame is constructed from metallic components.

8. The apparatus of claim 6, wherein the frame is releasably engageable to the polymer member.

9. The apparatus of claim 1, wherein a diameter of the passageway increases from said inlet to said outlet.

* * * * *